March 13, 1973        G. P. TROST        3,720,503
SOLDER CLAD METAL
Original Filed Nov. 7, 1966
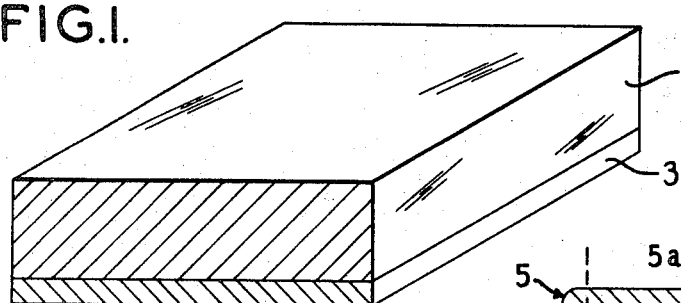
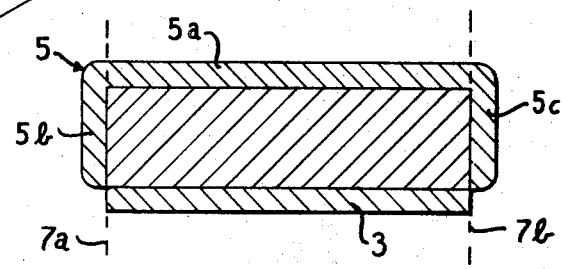
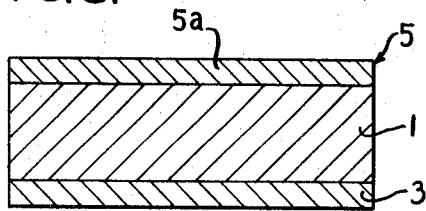
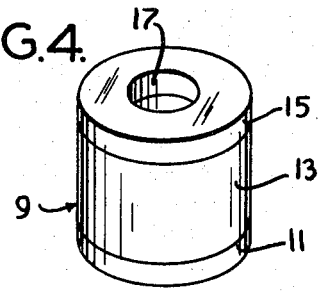
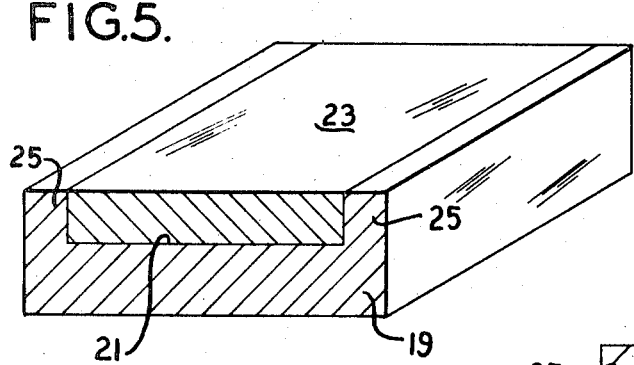
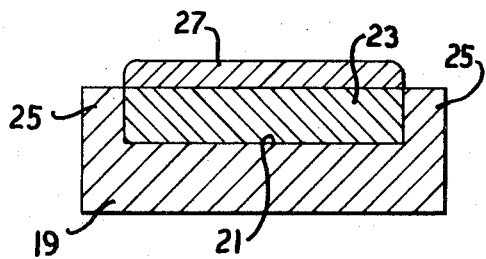
George P. Trost,
Inventor.
James P. McAndrews
Attorneys.

United States Patent Office 3,720,503
Patented Mar. 13, 1973

3,720,503
SOLDER CLAD METAL
George P. Trost, North Attleboro, Mass., assignor to Texas Instruments Incorporated, Dallas, Tex.
Original application Nov. 7, 1966, Ser. No. 592,579, now Patent No. 3,482,303, dated Dec. 9, 1969. Divided and this application Sept. 19, 1969, Ser. No. 871,230
Int. Cl. B32b *15/18*
U.S. Cl. 29—191.6                                 1 Claim

ABSTRACT OF THE DISCLOSURE

There is provided a three-component composite metal strip material from which articles to be soldered can be punched, comprising a strip of readily solderable metal solid-phased bonded to a strip of nonsolderable metal, and a layer of solder adhered to the exposed surface of the readily solderable metal which is inlaid in a groove in the nonsolderable metal.

---

This is a divisional of application Ser. No. 592,579, filed Nov. 7, 1966, now Pat. 3,482,303, dated Dec. 9, 1969.

Among the several objects of the invention may be noted the provision of a method for manufacturing a solder-clad metal composite which does not require application and subsequent removal of a temporary stop-off material in areas of metal which are not to be clad with the solder; the provision of a method for manufacturing multilayer metallic members comprising a solderable metal layer having selected portions of the layer clad with solder by a hot-dipping process and without requiring subsequent removal of any stop-off material; and the provision of a clad metal produced according to the methods of the invention. Other objects and features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated, FIG. 1 is a sectioned trimetric view showing laminated strip material to be partially clad with solder in accordance with the invention;

FIG. 2 is a cross section of the FIG. 1 material after it has been dipped in a liquid solder bath for solder-cladding;

FIG. 3 is a cross-sectional view showing the FIG. 2 material after certain portions of solder cladding have been removed;

FIG. 4 is an oblique view showing an article formed from the FIG. 3 material;

FIG. 5 is a sectioned trimetric view showing a bimetallic member which is to be provided with a solder coating according to a modified form of the invention; and FIG. 6 is a section showing the FIG. 5 material after it has been dipped in a liquid solder bath for solder-cladding.

Corresponding reference characters indicate corresponding parts throughout the several views of the drawings. The drawings being diagrammatic do not show thicknesses to scale.

In order to clad a metal with solder, the metal to be used as a base is dipped in a bath of hot solder material until a quantity of the solder is deposited on the base. It is sometimes necessary that part of one surface of the base shall not be clad with solder during its application to the base because it may jeopardize subsequent processing operations or steps. Therefore, a temporary stop-off material is usually applied to the base to prevent solder from contacting and being coated onto the surface covered by the stop-off material. The usual stop-off material must then be removed from the base metal so that other processing steps can be performed on what was the shielded surface of the base metal. The present invention provides for the manufacture of base metal clad with a solder layer wherein removal of stop-off material is unnecessary. The process provides clad metal suitable for use in manufacturing certain articles, such as, for example, base tabs used in the manufacture of transistors.

According to the present invention a strip 1 of base metal (FIG. 1) which is to receive a coating of solder is bonded to a base strip 3 of a metal which is either nonsolderable or which readily rejects solder. Metal 3 may be considered a permanent stop-off material in view of its ability to reject solder when immersed in a molten solder bath. Strips 1 and 3 may be bonded together, preferably by solid-phase bonding techniques, or liquid-phase techniques which will not melt at the melting temperature of the solder.

After strips 1 and 3 are bonded together they are dipped into a hot bath of liquid solder material. Some of the liquid solder adheres to the strip 1 forms a layer 5 of solder on all exposed surfaces of strip 1. Strips 1 and 3 remain in the solder bath until the desired thickness of solder has been deposited on strip 1. Then the strips are removed from the solder. As shown in FIG. 2, the solder layer 5 comprises a wide portion designated 5a, which covers the upper surface of the strip 1, and other portions 5b and 5c which cover the side edges of strip 1. Portions 5b and 5c overhang the strip 3. None of the solder adheres to the lower surface of strip 1 since it is shielded by the bonded strip 3. None of the solder adheres to the lower surface or side edges of the strip 3 since the material used for strip 3 is nonsolderable.

Then the overhanging portions 5b and 5c of the solder layer 5 are trimmed off along lines designated 7a and 7b which are flush with the side edges of strips 1 and 3. The resulting clad metal article is shown in FIG. 3 to comprise the strips 1 and 3 and the portion 5a of the solder layer 5. Layer 3 is not removed (as in the case of temporary stop-offs) but constitutes part of the final product which is in the form of a composite 1, 3 faced with solder 5a. Layer 3 may be a weldable metal so that it can be used for welding to other items an article formed from the clad composite. For example, FIG. 4 illustrates a circular member 9 punched from a clad strip such as shown in FIG. 3. This tab comprises a weldable but nonsolderable layer 11, a layer 13 to which solder adheres, and a layer 15 of solder adhered to the top of the layer 13. A hole 17 extends through the entire member 9. The member 9 may be welded by means of end 11 to a support and the solder end 15 used to form a soldered attachment to a device to be supported.

The variety of materials forming the composite will be clear from the following:

Strip 1 of the FIG. 3 clad metal article may be formed from solderable nickel, copper, brass, et cetera. Strip 3, on the other hand, may be formed of nonsolderable stainless steel, Kovar, aluminum, cobalt or nickel base alloys, titanium, zirconium, or other suitable metals or alloys which reject solder material. The solder layer 5 may be any suitable solder which can be applied to layer 1 by a hot-dipping process, as, for example, a conventional lead-tin-antimony alloy.

A composite clad metal article comprising a nickel strip 1 bonded to a stainless steel strip 3 and faced with a solder comprising a conventional lead-tin-antimony alloy has been found satisfactory for the manufacture of base tabs for transistors. The ratio or thicknesses of the various metals is variable, depending on the ultimate desired finall use. For example but without limitation, strip or layer 1 may constitute about 90% of the thickness of the article, layer 3 about 10%, and the solder 5a may constitute a thin film.

It should be noted that the nonsolderable material is useful not only as a stop-off during the manufacturing operation but also in its application by preventing the flow of solder material onto the surface protected by the nonsolderable material during the soldering operation.

FIGS. 5 and 6 of the drawings illustrate an embodiment of the invention whereby the need for trimming of excess solder from the clad metal is eliminated. As shown in FIG. 5, a strip 19 of a metal which rejects liquid solder is provided with a shallow groove 21 extending along its upper surface. The groove 21 is inlaid with a strip 23 of a metal (such as nickel) to which liquid solder will adhere. The strips 19 and 23 are bonded together by solid-phase bonding or liquid-bonding techniques. The side edges of strip 23 preferably abut shoulders 25 at the sides of groove 21. Then the two strips are run through a liquid bath of hot molten solder. Strip 19 rejects the solder so that there is no solder adhering to its surfaces when it is removed from the liquid bath. However, a layer 27 of solder is deposited on the exposed upper surface of strip 23. While solder 27 is shown projecting above the upper surface of shoulders 25 over strip 23, it will be understood that groove 21 can be sufficiently deep, relative to the thickness of the strip 23, and the amount of solder deposited can be regulated so that the upper surface of solder 27 deposited on strip 23 will be either above, below or substantially coplanar with the upper surface of the shoulders 25. Also, while only one groove 21 is shown in the base strip 19, it will be understood that a plurality of these grooves (or other shapes of recesses) may be provided, depending upon the intended use of the resulting clad metal strip. The composition of solder 27 and the metals used for strips 19 and 23 may be the same as those previously set forth.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A three-component composite metal strip material from which articles to be soldered can be punched comprising a strip of readily solderable metal solid-phase bonded to a strip of nonsolderable metal, and a layer of solder adhered to a single surface of said layer of readily solderable metal forming an exposed surface of said composite metal material, said strip of nonsolderable metal having a groove extending along one face thereof, said strip of readily solderable metal being inlaid in said groove with said single surface thereof exposed from said groove and with portions of said nonsolderable metal extending alongside said single surface.

References Cited
UNITED STATES PATENTS

| | | | |
|---|---|---|---|
| 2,777,193 | 1/1957 | Albright et al. | 29—626 |
| 2,024,150 | 12/1935 | Davignon | 29—196.6 |
| 1,959,925 | 5/1934 | Pryde | 29—481 |
| 1,996,183 | 4/1935 | Walters | 29—191.6 |

L. DEWAYNE RUTLEDGE, Primary Examiner

E. L. WEISE, Assistant Examiner

U.S. Cl. X.R.

29—194, 196.3, 196.6